United States Patent Office 3,217,028
Patented Nov. 9, 1965

3,217,028
POLYMERIC SECONDARY AMINES
AND NITRILES
Leonard R. Vertnik, Minneapolis, Minn., assignor to
General Mills, Inc., a corporation of Delaware
No Drawing. Filed Sept. 7, 1961, Ser. No. 136,426
7 Claims. (Cl. 260—465.5)

This invention relates to novel polymers and more particularly to novel condensation polymers.

The polymers of the present invention are characterized by the recurring structural unit:

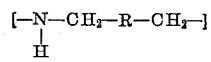

wherein R is a dimeric fat radical. These polymers are conveniently prepared by the condensation polymerization of a fatty dinitrile derived from a dimerized fat acid. In addition to the homopolymer products prepared by the homo-condensation of a fatty dinitrile, copolymer products can be prepared by the condensation copolymerization of a fatty dinitrile and a dinitrile copolymerizable therewith.

The condensation polymerization of the fatty dinitrile is accomplished by hydrogenating a fatty dinitrile under secondary-amine-forming conditions. By "secondary-amine-forming conditions" is meant that set of hydrogenation conditions under which a fatty nitrile preferentially forms a secondary amine rather than a primary amine. Secondary fatty amines are commercially available products and the conditions necessary to produce them are well understood in the art. Typical reaction conditions utilize hydrogen pressures in the range of 25 to 1000 p.s.i.g. at temperatures in the range of 200 to 290° C.

The preparative reaction is illustrated by the following equation:

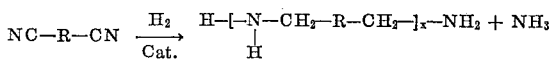

where R is a dimeric fat radical and X is the number of recurring units in the polymer chain. As illustrated in the equation, an ammonia by-product is formed. In order to obtain optimum yields of the desired polymer product, the ammonia by-product should be removed. Generally this is done by "sweeping" the reaction mixture with hydrogen gas.

Depending on the reaction conditions employed, the polymer products will vary in molecular weight from dimers in which X in the foregoing equation is 2, to high molecular weight products in which X is 40 or greater. The molecular weight of the polymer product can be varied by selection of the reaction conditions. Mild reaction conditions tend to produce lower molecular weight polymers while extremely severe reaction conditions produce insoluble cross-linked polymers. The lower molecular weight polymers are readily pourable, viscous liquids which resemble a heavy sirup. They are generally pale amber in color and are readily soluble in most common organic solvents. Aas the molecular weight increases, the products are generally more viscous, less soluble and darker in color. Products in which X is about 20 are extremely viscous and are difficult to pour even when heated.

A hydrogenation catalyst is employed to carry out the reaction of the present invention. Generally, any nitrile hydrogenation catalyst can be employed. The preferred catalysts are Raney nickel and copper-chromite catalysts. Other suitable catalysts include Raney cobalt, platinum, palladium, palladium on charcoal, platinum on charcoal, nickel on kieselguhr, copper-nickel carbonate, cadmium-copper-zinc chromite, copper-nickel oxide, and the like.

The "copper-chromite catalyst" referred to above is often referred to as "copper-chrominum oxide catalyst." Preparation of copper-chromite catalysts is discussed in an article by Connor, Folkers, and Adkins, in the "Journal of the American Chemical Society," vol. 54, pages 138–45 (1932) and in "Reactions of Hydrogen With Organic Compounds Over Copper-Chromium Oxide and Nickel Catalysts" by Homer Adkins, University of Wisconsin Press, Madison, Wisconsin, (1937). The nature of this catalyst is further discussed in an article by Adkins, Burgoyne, and Schneider in the Journal of the American Chemical Society, vol. 72, pages 2226–29 (1950). Commercially available copper-chromite catalysts often contain amounts of catalyst stabilizers, e.g., barium oxide, calcium oxide, and magnesium oxide. Catalysts containing such stabilizers can be employed in the instant invention if desired. While many types of copper-chromite catalysts are commercially available and are generally useful in the instant invention, it is preferred to employ a catalyst containing 40 to 65% CuO (assuming all copper is present as CuO) and 35 to 60% $Cr_2O_3$ (assuming all chromium to be present as $Cr_2O_3$).

The amount of catalyst employed is not critical. However, the molecular weight and other properties of the polymer product will vary depending on the amount and type of catalyst used. Generally, catalyst in the amount of 1 to 10% by weight, based on the weight of the nitrile charge, is sufficient for most purposes. Larger and smaller amounts of catalysts can be employed if desired.

The dinitrile starting materials for preparing the polymers of the present invention are the dinitriles prepared from dimerized fat acids. Relatively pure dimerized fat acids can be distilled from commercially available polymeric fat acids mixtures. The term "polymeric fat radical" as used herein refers to the hydrocarbon radical of a polymeric fat acid. The term "polymeric fat acid" refers to polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radicals" is generic to the divalent, trivalent and polyvalent hydrocarbon radicals of dimerized fat acids, trimerized fat acids and and higher polymers of fat acids, respectively. These divalent and trivalent radicals are referred to herein as dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly and mono ethylenically unsaturated acids such as 3-octenoic acid, 11-dodecanoic acid, linderic acid, lauroleic acid, myristoleic acid, tsuzui acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the prepartion of the polymeric fat acids.

The dimerized fat acid is then converted to the corresponding dinitriles by reacting the dimerized fat acid with ammonia under nitrile forming conditions. The details of this reaction are set forth in Chapter 2 of "Fatty Acids and Their Derivatives" by A. W. Ralston, John Wiley & Sons, Inc., New York (1948). If desired, the dinitrile may then be purified to the desired degree by vacuum distillation or other suitable means. Generally, the high purity dinitrile tends to produce linear polymers of high molecular weight. If appreciable amounts of mononitrile are present, the polymer will be of low molecular weight, since these materials act as chain-stoppers. The presence of trinitriles and other higher polyfunctional nitriles tends to produce a cross-linked polymer. A sufficient amount of trinitriles will provide a gelled product.

Copolymers can be prepared by copolymerizing mixtures of dinitriles. The desired dinitrile comonomer is added to the reaction mixture along with the fatty dinitrile. After subjecting the mixture to polymerization conditions, there is obtained a copolymer having randomly distributed recurring units:

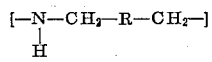

and

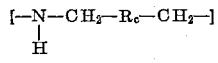

where R is a dimeric fat radical and $R_c$ is a divalent radical derived from the comonomer dinitrile. Generally, any copolymerizable dinitrile can be employed. Specific examples of simple nitriles which can be employed as comonomers include the dinitriles derived from such acids as adipic acid, pimelic acid, suberic acid, azelaic acid, and sebacic acid. Mixtures of two or more fatty dinitriles can also be copolymerized. A large variety of other dinitriles are likewise useful.

In theory, the formation of the polymeric amine proceeds through the preliminary reduction of the nitrile to the primary amine followed by conversion of the primary amine to the polymeric secondary amine. Accordingly, this provides an atlernate route for the preparation of the polymers. In the alternate route, the polyamines are formed separately and then converted to the polymeric amines under the conditions previously described, although it is possible to use somewhat milder conditions. In this instance, it is possible to use a variety of other polyamines as comonomers including some comonomers such as metaxylylene diamine which may not be readily employed in the form of nitriles.

From a practical standpoint, there may be certain advantages in thus carrying out the preparation of the polymeric amines in two steps since it makes possible the removal of any by-products formed in the first step, i.e., the formation of the primary amine and thus enhances the purity of the final product. In addition, the milder conditions used to form the polymeric amine from the diprimary amine results in less degradation and thus further enhances the purity of the final product.

Generally, the end groups of the polymers of the present invention will be either amine groups or nitrile groups. Where the polymers are prepared by condensing amines, all the end groups will be primary amines:

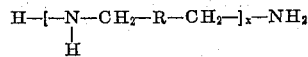

where R and X are as previously defined. Where a dinitrile is used as the starting material and the reaction conditions are mild and the reaction time is short, the end groups will be mainly nitrile groups:

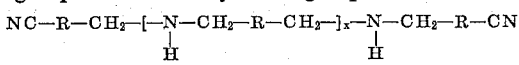

wherein R and X are as previously defined. When dinitriles are used as the starting material, under many reaction conditions a mixture of polymers will be obtained, some chains terminating in nitrile groups and other chains terminating in amine groups. These polymeric secondary amines have the following general structural formula:

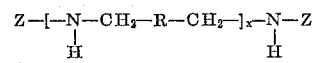

where R and X are as previously defined and Z is either H or —CH$_2$—R—CN. Where severe reaction conditions are utilized, the degradation of functional groups may cause some chains to terminate in hydrocarbon groups.

The invention will be better understood with respect to the following examples which illustrate certain preferred embodiments of the present invention. Unless otherwise specified, all parts and percentages used herein are by weight.

*Example I*

Into a 1 liter stirred autoclave were charged 417 grams of distilled dimer nitrile prepared from dimerized linoleic acid and 10 grams of water-wet Raney nickel catalyst. The autoclave was flushed with hydrogen, sealed under 150 p.s.i.g. hydrogen and rapidly heated to 200° C., at which time a continuous venting of hydrogen was begun such that the hydrogen coming into the autoclave was at 240 p.s.i. and the actual pressure in the autoclave was approximately 230 p.s.i. Heating was continued until the desired reaction temperature of 270° C. was reached. The hydrogenation was continued at this temperature for a period of 1⅓ hours. The reaction mixture was then cooled to below 200° C. and the catalyst was filtered off. There was obtained a product having a Brookfield viscosity of 114 poises at 25° C., a molecular weight of 4600 and an inherent viscosity of 0.165 as measured on a 0.5% solution in meta-cresol. Infrared analysis indicated that no nitrile groups were left in the product. The product contained 12.4% primary amine groups, 72.7% secondary amine groups, and 5.5% tertiary amine groups.

*Example II*

Example I was repeated except 21 grams of a commercially available copper-chromite catalyst "G–13," was substituted for the Raney nickel catalyst of Example I. There was obtained a product having a Brookfield viscosity of 4220 poises at 25° C., a molecular weight of 10,100 and an inherent viscosity of 0.262 as measured on a 0.5% solution in meta-cresol. The product contained 8.0% primary amine groups, 84.4% secondary amine groups, 5.1% tertiary amine groups, and no nitrile groups.

*Example III*

Example II was repeated except that the reaction was run at 250° C., for a period of 5⅓ hours. There was obtained a product having a Brookfield viscosity of 6200 poises at 25° C., a molecular weight of 11,000 and an inherent viscosity of 0.335 as measured on a 0.5% solution in meta-cresol. The product contained 6.5% primary amine groups, 85.9% secondary amine groups, 5.7% tertiary amine groups, and no nitrile groups.

*Example IV*

Example II was repeated except that the reaction time was increased to 2 hours. There was obtained a product having a Brookfield viscosity of greater than 20,000 poises at 25° C., a Brookfield viscosity of 6400 poises at 60° C., a molecular weight of 9900, and an inherent viscosity of 0.334 as measured on a 0.5% solution in meta-cresol. The product contained 7.0% primary amine groups, 81.4% secondary amine groups, 7.6% tertiary amine groups, and no nitrile groups.

*Example V*

Into a 1 liter stirred autoclave were charged 400 grams of crude undistilled dimer nitrile prepared from vacuum stripped dimerized linoleic acid, and 100 grams monomer nitrile prepared from the recovered monomeric acid obtained from the polymerization of linoleic acid, and 25 grams of copper-chromite of Example II. After hydrogenation at 280° C. for 1⅓ hours, there was obtained a product having a Brookfield viscosity of 241 poises at 25° C., 6.9% primary amine groups, 81.2% secondary amine groups, 5.6% tertiary amine groups, and 2.8% nitrile groups.

*Example VI*

A crude undistilled dimer nitrile prepared from vacuum stripped dimerized linoleic acid was treated with a mixture of copper-chromite catalyst recovered from the reaction mixture of a previous successful hydrogenation, and diatomaceous earth. The level of catalyst used in this pretreatment was about 5% by weight, based on the nitrile. The dimer nitrile was recovered by filtration. Into a 1 liter stirred autoclave were charged 442 grams of the treated dimer nitrile and 21 grams of the copper-chromite catalyst of Example II. After hydrogenation at 280° C. for 1⅓ hours, there was obtained a product having 9.2% primary amine groups, 71.9% secondary amine groups, 5.8% tertiary amine groups, and 5.6% nitrile groups. The product had a Brookfield viscosity of 639 poises at 25° C. and a molecular weight of 4200.

*Example VII*

A crude undistilled dimer nitrile prepared from vacuum stripped dimerized linoleic acid was washed with 1.5 grams of sodium hydroxide which had been dissolved in ethanol. After separating the solutions, 400 grams of the treated dimer nitrile and 20 grams of the copper-chromite catalyst of Example II were charged into 1 liter autoclave. After hydrogenation at 280° C. for 1½ hours there was obtained a product having a molecular weight of 3000, a Brookfield viscosity at 25° C. of greater than 20,000 poises and a Brookfield viscosity at 60° C. of 1,260 poises. Analysis of the product indicated that it had 15.8% primary amine groups, 60.7% secondary amine groups, 9.4% tertiary amine groups, and no nitrile groups.

*Example VIII*

Into a 1 liter stirred autoclave were charged 530 grams of a distilled dimer nitrile having an iodine value of 8.5 prepared from a distilled dimer acid essentially saturated by hydrogenation having an iodine value of 8.4 and 25 grams of the copper-chromite catalyst of Example II. After hydrogenation for 3 hours at 270° C. there was obtained a product having an apparent molecular weight of 5,800, an iodine value of 10.3, a Brookfield viscosity of greater than 20,000 poises at 25° C., and a Brookfield viscosity of 2,240 poises at 60° C. The product contained 9.6% primary amine groups, 76.7% secondary amine groups, 5.4% tertiary amine groups, and no nitrile groups.

*Example IX*

Example VIII was repeated except that 9.6 grams of methanol-wet Raney nickel was used as a catalyst for 400 grams of nitrile. After hydrogenation at 270° C. for 1⅓ hours, there was obtained a gelled product.

*Example X*

Into a 1 liter stirred autoclave were charged 405 grams of distilled dimer nitrile prepared from dimerized linoleic acid, 81 grams of adiponitrile, and 25 grams of the copper-chromite catalyst of Example II. After hydrogenation at 270° C. for 2 hours, there was obtained a copolymer product having 6.3% primary amine groups, 49.6% secondary amine groups, 18.1% tertiary amine groups, a Brookfield viscosity of 338 poises at 25° C., and a Brookfield viscosity of 60 poises at 60° C.

*Example XI*

Example I was repeated that the hydrogenation was carried out at a reaction pressure of 90 p.s.i. for 4 hours at 232 to 248° C. using 10 g. of methanol-wet Raney nickel catalyst. There was obtained a product having 1% primary amine groups, 72.3% secondary amine groups, 6.1% tertiary amine groups, 11.8% nitrile groups, an iodine value of 83.4%, and a Brookfield viscosity of 660 poises at 25° C.

*Example XII*

Into a 1 liter stirred autoclave was charged 300 grams of a distilled dimer diamine having a total amine number of 205.1 as compared to theoretical value of 204.2 which was prepared by hydrogenating dimer nitrile in the presence of ammonia, and 12 grams of methanol-wet Raney nickel catalyst. After hydrogenating the mixture for 2 hours using the conditions of Example I, there was obtained a polymeric product having 23.3% primary amine groups, 69.5% secondary amine groups, 4.8% tertiary amine groups, and a Brookfield viscosity of 65.2 poises at 25° C.

*Example XIII*

Into a 1 liter stirred autoclave was charged 68 grams of meta xylylene diamine, 291 grams of the distilled dimer diamine of Example XII, and 10 grams of the copper-chromite catalyst of Example II. After hydrogenating for 1⅔ hours using the reaction conditions of Example I, there was obtained a copolymeric product having an amine number due to secondary amines of 117.8. In comparison, the product of Example XII had an amine number due to secondary amines of 76.6 and the product of Example III had an amine number due to secondary amines of 90.3. The higher amine number for the product of this example indicates a larger weight percent of secondary amine groups due to formation of the copolymer.

The foregoing examples have been included as illustrations of certain preferred embodiments of the present invention and are not to be construed as limitations on the scope thereof.

The products of the present invention are highly effective corrosion inhibitors. They are also useful as asphalt anti-stripping agents, epoxy curing agents, flocculents, liquid ion exchange agents, antistatic agents, fuel oil stabilizers, and cargohydrate modifying agents.

The embodiments of the present invention in which an exclusive property or privilege is claimed are defined as follows:

1. The polymer of the structure:

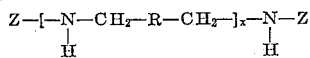

wherein R is the divalent hydrocarbon radical of a dimerized fat acid, said dimerized fat acid having been prepared by polymerizing a fat acid containing 8 to 24 carbon atoms, X is an integer in the range of 2 to 40 and Z is selected from the group consisting of H and —CH$_2$—R—CN.

2. The polymer of the structure:

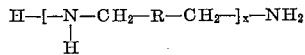

wherein R is the divalent hydrocarbon radical of a dimerized fat acid, said dimerized fat acid having been prepared by polymerizing a fat acid containing 8 to 24 carbon atoms, and X is an integer in the range of 2 to 40.

3. The polymer of claim 2 wherein R is the divalent hydrocarbon radical of dimerized linoleic acid, said dimerized linoleic acid having been prepared by polymerizing linoleic acid.

4. The polymer of the structure:

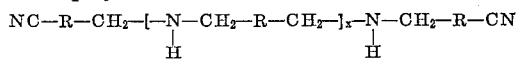

wherein R is the divalent hydrocarbon radical of a dimerized fat acid, said dimerized fat acid having been prepared by polymerizing a fat acid containing 8 to 24 carbon atoms, and X is an integer in the range of 2 to 40.

5. The polymer of claim 4 wherein R is the divalent hydrocarbon radical of dimerized linoleic acid, said dimerized linoleic acid having been prepared by polymerizing linoleic acid.

6. A process for preparing polymeric secondary amines comprising: (1) hydrogenating an aliphatic diprimary diamine of the structure:

wherein R is the divalent hydrocarbon radical of a dimerized fat acid, said dimerized fat acid having been prepared by polymerizing a fat acid containing 8 to 24 carbon atoms, in the presence of a hydrogenation catalyst and at a hydrogen pressure in the range of about 25 to 1000 p.s.i. and a temperature in the range of about 200 to 290° C. while removing by-product ammonia by sweeping the reaction mixture with hydrogen gas; and (2) recovering the high molecular weight polymeric secondary amines formed thereby, said amines having the structure:

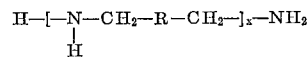

wherein R is as defined above and X is an integer in the range of 2 to 40.

7. A process for preparing polymeric secondary amines comprising: (1) hydrogenating an aliphatic dinitrile of the structure:

wherein R is the divalent hydrocarbon radical of a dimerized fat acid, said dimerized fat acid having been prepared by polymerizing a fat acid containing 8 to 24 carbon atoms, in the presence of a hydrogenation catalyst and at a hydrogen pressure in the range of about 25 to 1000 p.s.i. and a temperature in the range of about 200 to 290° C. while removing by-product ammonia by sweeping the reaction mixture with hydrogen gas; and (2) recovering the high molecular weight polymeric secondary amines formed thereby, said amines having the structure:

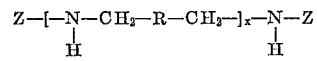

where R is as defined above, X is an integer in the range of 2 to 40 and Z is selected from the group consisting of H and —CH$_2$—R—CN.

References Cited by the Examiner

UNITED STATES PATENTS 2,177,619 10/39 Nicodemus et al. _____ 260—464
2,435,553 2/48 Bruson et al. _____ 260—465.8

CHARLES B. PARKER, *Primary Examiner.*

HAROLD N. BURSTEIN, *Examiner.*

UNITED STATES PATENT OFFICE
CERTIFICATE OF CORRECTION

Patent No. 3,217,028                                                      November 9, 1965

Leonard R. Vertnik

It is hereby certified that error appears in the above numbered patent requiring correction and that the said Letters Patent should read as corrected below.

Column 1, line 61, for "Aas" read -- As --; column 2, line 41, after "to" insert -- a --; column 5, line 59, for "sodum" read -- sodium --; column 6, line 29, after "repeated" insert -- except --; line 74, for "cargohydrate" read -- carbohydrate --.

Signed and sealed this 27th day of September 1966.

(SEAL)
Attest:

ERNEST W. SWIDER                                         EDWARD J. BRENNER
Attesting Officer                                                Commissioner of Patents